United States Patent
Fahlbusch et al.

(10) Patent No.: US 7,800,848 B2
(45) Date of Patent: Sep. 21, 2010

(54) TEMPERABLE LENS, ESPECIALLY FOR MICROSCOPES

(75) Inventors: Ingo Fahlbusch, Goettingen (DE); Frank Nolte, Dransfeld (DE); Georg Herbst, Goettingen (DE)

(73) Assignee: Carl Zeiss MicroImaging GmbH, Jena (DE)

( * ) Notice: Subject to any disclaimer, the term of this patent is extended or adjusted under 35 U.S.C. 154(b) by 433 days.

(21) Appl. No.: 11/791,913

(22) PCT Filed: Dec. 20, 2005

(86) PCT No.: PCT/EP2005/013729

§ 371 (c)(1),
(2), (4) Date: May 30, 2007

(87) PCT Pub. No.: WO2006/072389

PCT Pub. Date: Jul. 13, 2006

(65) Prior Publication Data

US 2008/0013195 A1    Jan. 17, 2008

(30) Foreign Application Priority Data

Jan. 8, 2005    (DE) .................... 10 2005 001 102

(51) Int. Cl.
*G02B 7/02*    (2006.01)
*G02B 21/00*    (2006.01)

(52) U.S. Cl. ............... 359/820; 359/368; 359/381; 359/385; 359/391; 250/443.1; 250/311; 219/200

(58) Field of Classification Search ......... 359/820–823, 359/293, 381–383, 385, 395, 398, 512, 554, 359/557; 250/311, 397, 440.11, 443.1; 219/200, 219/201, 535; 396/231, 251; 353/100–103
See application file for complete search history.

(56) References Cited

U.S. PATENT DOCUMENTS 2,424,719 A * 7/1947 Stoeck et al. ............... 362/258

(Continued)

FOREIGN PATENT DOCUMENTS

FR    1 057 067    12/2000

(Continued)

OTHER PUBLICATIONS

Patent Abstracts of Japan: Publication No. 62-115116, published May 26, 1987 "Method for Preventing Fogging of Endoscope" Appln No. 61-172610 Jul. 22, 1986.

(Continued)

*Primary Examiner*—Loha Ben
(74) *Attorney, Agent, or Firm*—Frommer Lawrence & Haug LLP

(57) ABSTRACT

The invention is directed to a temperature-controllable objective, particularly for microscopes and other optical equipment, which comprises a main barrel as the main component part of the objective. The main barrel contains at least one correction mount, cylinder sleeves, mounting rings, carrier rings and/or adjusting rings, and imaging optical elements. In order to control the temperature, at least one structural component part of the objective or an element arranged between structural component parts of the objective is constructed as a temperature-controllable element or as a temperature-controllable foil which is connected (not shown) by leads to a device for monitoring temperature. Further, a temperature gauge or temperature sensor is arranged in the objective and is likewise connected to the device for monitoring temperature.

7 Claims, 2 Drawing Sheets

U.S. PATENT DOCUMENTS

| | | | | |
|---|---|---|---|---|
| 3,100,817 | A * | 8/1963 | Rosendahl | 359/293 |
| 3,171,955 | A * | 3/1965 | Cardile | 250/443.1 |
| 3,187,173 | A * | 6/1965 | Foley et al. | 362/294 |
| 3,438,690 | A * | 4/1969 | Skerman | 359/391 |
| 3,444,365 | A * | 5/1969 | Loebe | 250/443.1 |
| 3,969,013 | A * | 7/1976 | Poty et al. | 374/17 |
| 4,355,861 | A | 10/1982 | Sebald | |
| 4,460,245 | A * | 7/1984 | Shimizu | 359/820 |
| 4,833,330 | A * | 5/1989 | Swann et al. | 250/443.1 |
| 5,343,018 | A * | 8/1994 | Limbach | 219/200 |
| 5,410,429 | A * | 4/1995 | Focht | 359/395 |
| 6,144,510 | A * | 11/2000 | Neil et al. | 359/820 |
| 6,867,914 | B2 * | 3/2005 | Kawarabata et al. | 359/381 |
| 6,961,080 | B2 * | 11/2005 | Richardson | 348/80 |
| 7,271,966 | B2 * | 9/2007 | Herbst et al. | 359/813 |
| 7,307,784 | B2 * | 12/2007 | Kinoshita et al. | 359/368 |
| 7,315,412 | B2 * | 1/2008 | Kinoshita et al. | 359/368 |
| 2003/0058530 | A1 | 3/2003 | Kawano | |

FOREIGN PATENT DOCUMENTS

WO      99/42886      8/1999

OTHER PUBLICATIONS

Patent Abstracts of Japan: Publication No. 2002-250869, published Sep. 6, 2002 "Lens Heater and Warm-up Device for Microscopic Observation with lens Heater" Appln No. 2001-049807 Feb. 26, 2001.

* cited by examiner

TEMPERABLE LENS, ESPECIALLY FOR MICROSCOPES

CROSS-REFERENCE TO RELATED APPLICATIONS

This application claims priority of International Application No. PCT/EP2005/013729, filed Dec. 20, 2005 and German Application No. 10 2005 001 102.0, filed Jan. 8, 2005, the complete disclosures of which are hereby incorporated by reference.

FIELD OF THE INVENTION

The invention is directed to a temperature-controllable objective, particularly for microscopes, which is used for observing living biological specimens, for example, in living cells. By objective is meant objectives with or without correction mounts.

DESCRIPTION OF THE RELATED ART

In most cases, observation of living cell specimens is carried out, for example, at temperatures of about 37° C. The specimens must be brought to this temperature and maintained at this temperature during the observation period. At high magnifications, it is necessary, of course, to work at a very short distance between the objective and the object and when there is a difference in temperature between the objective and the temperature-controlled specimen or object, an uncontrolled transfer of heat or dissipation of heat can result through the objective. Different steps and arrangements have been developed to prevent this and to control the temperature of the objective depending on the temperature of the object being observed.

The publication by PeCon GmbH "Konstruktion von Laborgeräten für die Zellund und Gewebekultur", Erbach-Bach, Germany, discloses an objective heater which has an oil duct and is attached to the microscope objective with sufficient thermal contact. The temperature of the oil flowing though the oil duct is regulated by a temperature regulator. A drawback of this device is that it must be attached to the objective as an additional assembly and requires additional space. Accordingly, it limits access to the object space. Further, an unwanted lever action can occur at the objective because it is burdened on one side by the device. Also, a separate heater is required for every objective diameter. The temperature control of the objective is thermally inefficient owing to the indirect heating of the objective.

EP 1 057 064 B1 discloses a device by which the temperature of all of the objectives arranged in an objective turret can be controlled simultaneously. For this purpose, a sleeve in which a coolant or heating medium circulates is placed around the objective turret. Therefore, it is not possible in this device to control the temperature of individual objectives without influencing the other objectives, which would be useful in certain applications.

In the arrangement described in U.S. Pat. No. 5,343,018, an additional component part in the form of a sleeve outfitted with a heating element is fitted over the objective whose temperature is to be controlled. The heating element is connected to the sleeve or is embedded therein. It can also be arranged between the sleeve and objective mount.

U.S. Pat. No. 5,410,429 discloses a flexible heating element made, for example, of rubber with embedded heating wire which is placed around the mount of the microscope objective whose temperature is to be controlled. The heating element is connected to a controllable heat source.

All of these known devices are additional, adapter-enabled structural component parts that must be arranged at the objective or objective turret. A separate element must always be provided for every objective diameter.

OBJECT AND SUMMARY OF THE INVENTION

Accordingly, it is the primary object of the invention to provide an objective, particularly for microscopes, whose temperature can be controlled in a simple construction using simple means and substantially without additional structural component parts without substantially changing the external dimensions of the objective or additionally limiting the object space of the microscope.

According to the invention, this object is met in a temperature-controllable objective, particularly for microscopes, comprising, as component parts of the objective, a main barrel in which are included cylinder sleeves, carrier rings and/or adjusting rings, and imaging optical elements; and at least one structural component part of the objective or an element arranged between structural component parts of the objective being constructed as a temperature-controllable element.

To realize a broad temperature range for the temperature control, it is advantageous when the temperature-controllable element is constructed as a heater element and/or a cooling element. The temperature-controllable element can be constructed, for example, as a resistance heating element for heating or as a Peltier element. The latter can be used in a known manner for heating and for cooling.

In another advantageous construction in which neither the external dimensions nor the weight of the objective are changed, the temperature-controllable element is a part of the mount or another structural component part of the objective.

Further, it can be advantageous when the temperature-controllable element is constructed as a foil which is arranged between structural component parts of the objective or in a structural component part of the objective or in a plurality of structural component parts of the objective. For example, the temperature-controllable element can be arranged in or between parts of the objective mount.

It is advantageous particularly for achieving a lightweight construction when the temperature-controllable element comprises carbon fiber material or another suitable material.

Further, in order to realize an efficient temperature monitoring, it is advantageous when a temperature gauge or temperature sensor which is connected to a device for monitoring and regulating temperature is provided in the objective.

Further, in order to realize an efficient and reliable monitoring and regulating of temperature, it is advantageous when the temperature-controllable element is connected to the device for monitoring and regulating the temperature.

An objective constructed according to the invention does not limit access to the object space of the microscope because it avoids additional components on the outside of the objective. Therefore, the weight of the objective is also not increased and one-side loading by an externally arranged heater and therefore also a possible lever action caused by additional structural component parts arranged on the outer side are prevented. The external dimensions of the objective are not affected by the temperature-controllable element. By arranging the temperature-controllable element in the interior of the objective, the temperature of the objective or the temperature of parts of the objective close to the object can be controlled directly and in a deliberate manner. It is possible at any time to load the entire objective turret with objectives without limitations.

The invention will be described more fully in the following with reference to an embodiment example.

DESCRIPTION OF THE PREFERRED EMBODIMENTS

Figure 1:
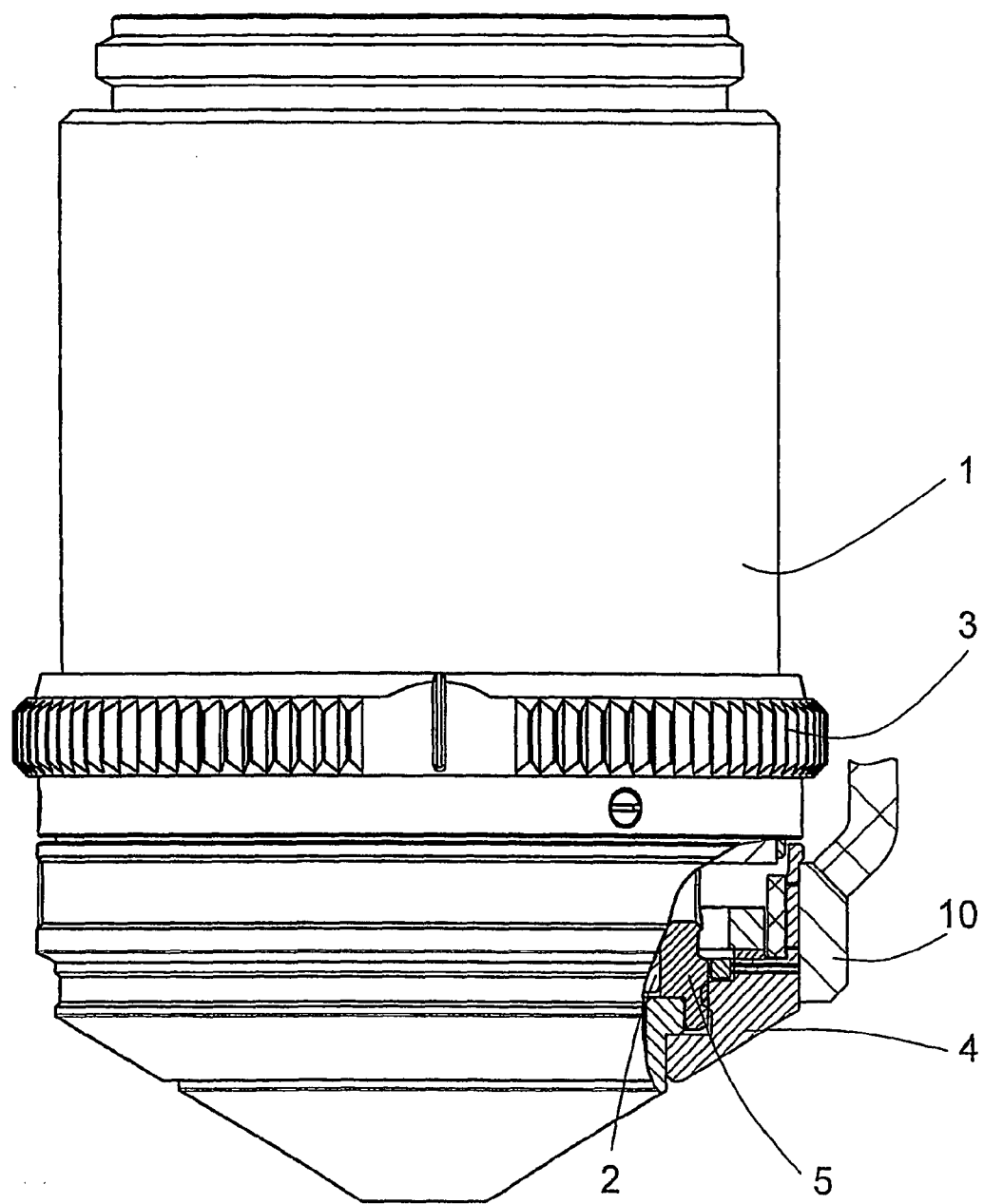
FIG. 1 shows an objective with a temperature-controllable element.

The temperature-controllable objective shown in FIG. 1 is intended especially for microscopes or for other optical devices and can be constructed as a rigid objective without a correction mount with fixedly positioned imaging optical elements or as an objective with at least one correction mount with adjustable optical elements. It comprises a main barrel 1 in which are arranged component parts of the objective such as cylinder sleeves, mounting rings 2, adjusting rings 3, and carrier rings which can be adjusted, for example, by externally actuable adjusting rings 3 for corresponding positioning of imaging optical elements (not shown) for focusing or changing the imaging scale. This imaging optical elements can be individual lenses or lens groups.

Figure 2:
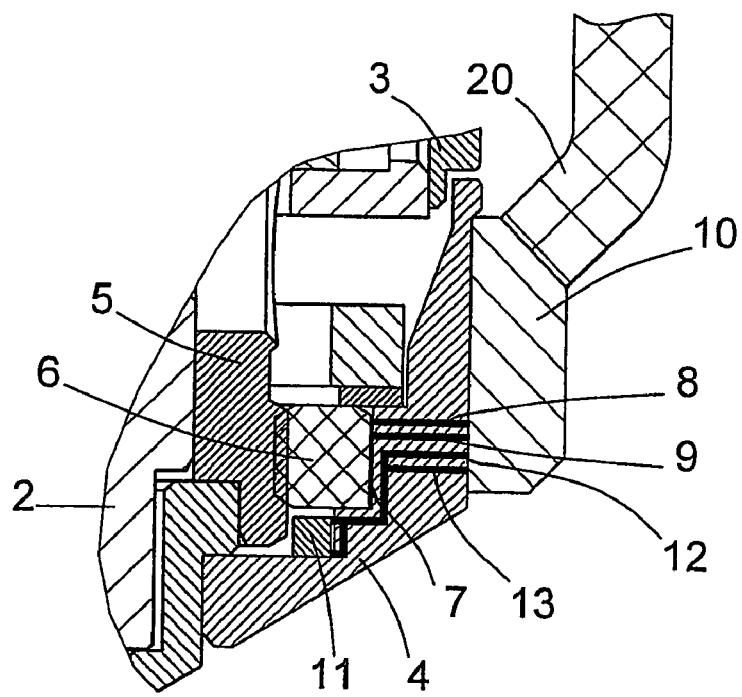
FIG. 2 shows a section from an objective with a temperature-controllable objective part.

Also provided is a mounting ring 4 which is screwed onto an bushing 5, advantageously at the object-side end of the objective. As is shown in FIG. 2, a temperature-controllable element 6 is arranged inside the mounting ring 4. This temperature-controllable element 6 intimately contacts, by at least one of its boundary surfaces, inner surfaces 7 of the mounting ring 4 in order to realize a good transfer of heat with the mounting ring 4. The temperature-controllable element 6 is constructed as a resistance heating element or as a Peltier element, known per se, and communicates via power supply lines 8 and 9 with a connection part 10 by which the temperature-controllable element 6 can be supplied with power. A Peltier element has proven particularly advantageous for controlling the temperature of the objective or of parts of the objective because it can heat and also cool the objective in a simple manner by means of a corresponding polarity of the connections. For monitoring temperature, a temperature gauge 11 is provided in the objective and is connected by electric leads 12 and 13 to the connection part 10. The connection part 10 can advantageously be constructed as a socket and is arranged on the outer side of the objective.

The temperature-controllable element 6 can also be provided as an additional structural component part in the objective and can even replace a structural component part of the objective. It can also comprise carbon fiber material or another suitable material.

Figure 3:
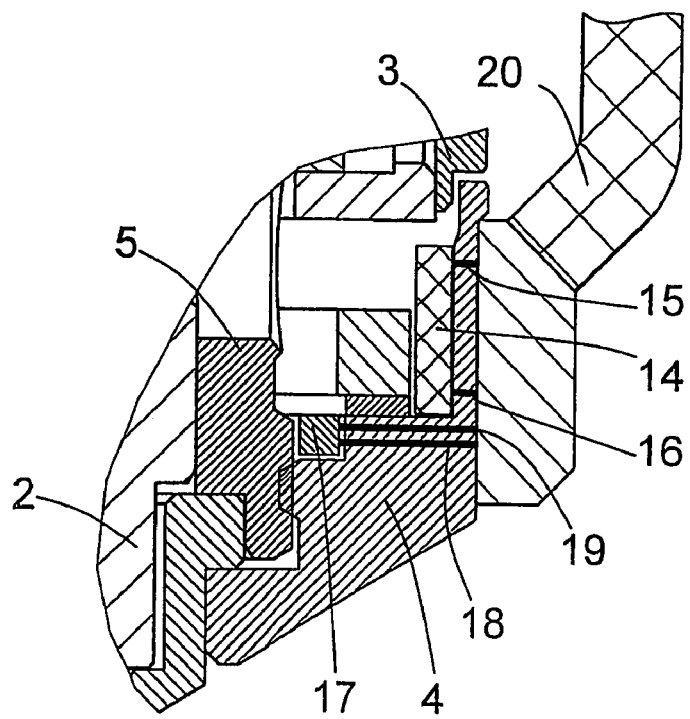
FIG. 3 shows a section from an objective with a temperature-controllable foil.

FIG. 3 shows a section from an objective with a temperature-controllable foil 14. In this construction, the temperature-controllable element 6 is constructed as a temperature-controllable foil 14 which is arranged in the interior of the mounting ring 4 in intimate contact with the latter. The foil 14 is connected to the connection part 10 by leads 15 and 16. A temperature gauge 17 which is connected to the connection part 10 by connections 18 and 19 is also provided in the objective.

The connection part 10 which is advantageously formed as a socket is connected to a device for temperature monitoring or temperature regulation (not shown in the drawings), e.g., by a corresponding plug in a known manner by a lead 20.

While the foregoing description and drawings represent the present invention, it will be obvious to those skilled in the art that various changes may be made therein without departing from the true spirit and scope of the present invention.

REFERENCE NUMBERS

1 main barrel
2 mounting ring
3 adjusting ring
4 mounting ring
5 bushing
6 temperature-controllable element
7 inner surface
8 power supply line
9 power supply line
10 connection part
11 temperature gauge
12 lead
13 lead
14 foil
15 lead
16 lead
17 temperature gauge
18 connection
19 connection
20 lead

The invention claimed is:

1. A temperature-controllable objective for optical microscopes, comprising:
    a main barrel;
    cylinder sleeves;
    carrier rings and/or adjusting rings;
    imaging optical elements; and
    a temperature-controllable element which controls the temperature of the objective;
    wherein the cylinder sleeves, the carrier rings and/or adjusting rings, the imaging optical elements, and the temperature-controllable element are contained in the main barrel of the objective.

2. The objective according to claim 1, wherein the temperature-controllable element is constructed as a heating element and/or as a cooling element.

3. The objective according to claim 1, wherein the temperature-controllable element is a part of an objective mount.

4. The objective according to claim 1, wherein the temperature-controllable element is constructed as a foil which is arranged between structural component parts of the objective or in a structural component part of the objective or in a plurality of structural component parts of the objective in the interior of the main barrel.

5. The objective according to claim 1, wherein the temperature-controllable element comprises carbon fiber material or another suitable material.

6. The objective according to claim 1, wherein a temperature gauge which is connected to a device for monitoring and regulating temperature is provided in the interior of the objective.

7. The objective according to claim 1, wherein the temperature-controllable element is connected to the device for monitoring and regulating temperature.

\* \* \* \* \*